United States Patent

Federzoni et al.

[11] Patent Number: 6,158,562
[45] Date of Patent: Dec. 12, 2000

[54] CLUTCH FRICTION AND RING FOR DRY DISK CLUTCH, MORE PARTICULARLY FOR MOTOR VEHICLE

[75] Inventors: Luc Federzoni, Bourgoin Jallieu; Daniel Benoit, Limoges, both of France

[73] Assignee: Valeo, Paris, France

[21] Appl. No.: 09/242,522

[22] PCT Filed: Jun. 9, 1998

[86] PCT No.: PCT/FR98/01181

§ 371 Date: Feb. 17, 1999

§ 102(e) Date: Feb. 17, 1999

[87] PCT Pub. No.: WO98/58185

PCT Pub. Date: Dec. 23, 1998

[30] Foreign Application Priority Data

Jun. 17, 1997 [FR] France ................................. 9707477

[51] Int. Cl.[7] .................................................. F16D 13/72
[52] U.S. Cl. ................................................... 192/113.22
[58] Field of Search ..................... 192/113.22, 113.26, 192/113.23, 113.2, 107 R, 113.36, 101, 70.12, 70.14, 107 M

[56] References Cited

U.S. PATENT DOCUMENTS

| 1,527,197 | 2/1925 | Klocke ............................ 192/113.22 X |
|---|---|---|
| 1,700,860 | 2/1929 | Snell ..................................... 192/70.14 |
| 2,180,086 | 11/1939 | Kraft ................................ 192/70.14 X |
| 2,927,673 | 3/1960 | Sand ..................................... 192/70.14 |
| 3,198,295 | 8/1965 | Fangmann et al. ............. 192/113.36 X |
| 3,347,107 | 10/1967 | Flichy ................................ 192/70.14 X |
| 4,027,758 | 6/1977 | Gustavsson et al. ............... 192/113.36 |
| 4,139,085 | 2/1979 | Kanbe et al. ........................ 192/107 R |
| 4,878,282 | 11/1989 | Bauer . |
| 5,101,953 | 4/1992 | Payvar ................................ 192/107 R |
| 5,176,236 | 1/1993 | Ghidorzi et al. . |
| 5,738,198 | 4/1998 | Walth et al. .................... 192/107 R X |
| 5,865,283 | 2/1999 | Hirayanagi et al. ............ 192/107 R X |

FOREIGN PATENT DOCUMENTS

| 0 305 581 | 9/1987 | European Pat. Off. . |
|---|---|---|
| 0 260 828 | 3/1988 | European Pat. Off. . |
| 0 625 647 | 2/1994 | European Pat. Off. . |
| 44 43 096 | 5/1996 | Germany . |

OTHER PUBLICATIONS

Patent Abstracts of Japan, vol. 9, No. 42 (M–359), Feb. 22, 1985 & JP 59 183119 A (Aishin Seiki), Oct. 18, 1984.
Patent Abstracts of Japan, vol. 10, No. 171 (M–489), Jun. 17, 1986 & JP 61 021425 A (Toyota), Jan. 30, 1986.
International Search Report dated Aug. 13, 1998.

*Primary Examiner*—Rodney H. Bonck
*Attorney, Agent, or Firm*—Morgan & Finnegan, LLP

[57] ABSTRACT

The invention concerns a clutch friction disk for a dry disk clutch, more particularly for a motor vehicle, comprising two friction rings including structure generating an air pressure force under the effect of the rotating friction disk, comprising a circumferential groove (20) communicating with a plurality of radial grooves (30) emerging at the friction ring internal periphery (13).

26 Claims, 1 Drawing Sheet

CLUTCH FRICTION AND RING FOR DRY DISK CLUTCH, MORE PARTICULARLY FOR MOTOR VEHICLE

BACKGROUND OF THE INVENTION

The present invention relates to a clutch friction disc for a dry friction clutch, more particularly for a motor vehicle, and also to a friction crown of friction material for equipping such a friction disc.

A motor vehicle dry friction clutch includes, in general terms, a friction disc having two friction crowns, each of which is secured to a support which may be a common support, the support or supports being connected to a splined hub in engagement with a gearbox input shaft. A torsion damping device is, in general, interposed between the support or supports for the crowns and the splined hub. A progressive engagement device is generally disposed between the two crowns, being constituted by the support or supports which have particular arrangements for this purpose, or by an additional device.

The friction disc is, in use, placed between, on the one hand, a reaction plate which is connected directly or indirectly to the crankshaft of the engine of the vehicle, and on the other hand, a pressure plate of a clutch mechanism which includes a cover plate coupled to the reaction plate and an elastic system, which in practice is a spring or so-called diaphragm applying an axial biasing force to the pressure plate, which is coupled in rotation to the cover plate while being able to be displaced axially with respect to the latter by a limited amount.

In the clutch engaged position, the friction crowns of the friction disc are gripped under the effect of the elastic system between the reaction plate and the pressure plate, in such a way that the rotation torque from the heat engine is transmitted to the gearbox input shaft.

Declutching means, which in practice consist of fingers with which the diaphragm is provided, eliminate the effect of the elastic system when a force is applied to them, which, under the effect of return means of the pressure plate acting between the pressure plate and the cover plate, causes the pressure plate to be displaced away from the reaction plate, and therefore causes the friction crowns of the friction disc to be released from being gripped, so that the friction disc, which is mounted for axial movement on the gearbox input shaft, is displaced between the reaction plate and the pressure plate, and the effect of this is to interrupt the transmission of the torque from the engine.

In order that the interruption of the transmission of the torque shall be otal, the declutching operation must be complete, that is to say the friction crowns must no longer be in contact with the reaction plate and the pressure plate.

BRIEF SUMMARY OF THE INVENTION

The Applicant has discovered the existence of phenomena which disturb correct disengagement of the friction crowns.

In this connection, there frequently occurs an unequal disengagement of the friction crown from one of the adjacent plates (i.e. the reaction plate or pressure plate), or even retention against one of the plates, which causes a residual torque to be transmitted to the gearbox input shaft, a consequence of which is that it leads firstly to difficulty in changing gear, and secondly to the occurrence of premature wear in the components of the gearbox.

DETAILED DESCRIPTION OF THE INVENTION

An object of the present invention is to overcome these drawbacks.

A clutch friction disc for a dry friction clutch, more particularly for a motor vehicle, having two friction crowns, is, in accordance with the invention, characterised in that the said friction crowns include means for generating an air pressure force under the effect of the rotation of the friction disc, in that the said means for generating an air pressure force comprise grooves formed on the face of each of the friction crowns adapted to come into contact with a reaction plate and a pressure plate, respectively, of a clutch, and in that the said grooves comprise a circumferential groove in communication with a plurality of radial grooves which are open at the inner periphery of the friction crown.

Thus the disengagement of the friction crowns and the release of the disc from being clamped are correctly ensured.

In accordance with further aspects of the invention, taken separately or in all their technically possible combinations:

- the grooves are disposed symmetrically, as between one friction crown and the other, with respect to a median plane of the friction disc, in such a way as to set up air pressure forces on either side of the rotating friction disc which are substantially equal and opposite;
- at least one radial groove has a cross section which becomes wider in the radial direction towards the outside of the crown;
- the said circumferential groove is isolated from the outer periphery of the friction crown;
- the said circumferential groove is in communication with the outer periphery of the friction crown through at least one groove having a cross section which becomes wider in the radial direction towards the outside of the crown;
- the said circumferential groove is in communication with the outer periphery of the friction crown through an element which creates a loss of energy;
- the said element for creating a loss of energy comprises at least one groove of smaller cross section than the said circumferential and/or radial grooves;
- the said element for creating a loss of energy comprises at least one groove having a constriction;
- a single circumferential groove is formed in the friction crown;
- the said circumferential groove is situated in a zone lying between the halfway point on the radius of the friction crown and the outer periphery of the latter;
- the said circumferential groove is on a radius situated between about two-thirds of the radius of the friction crown and its outer periphery;
- the said circumferential groove has a trapezoidal cross section;
- the said radial grooves have a trapezoidal cross section.

The invention also provides a friction crown for a friction disc for a dry friction clutch, having grooves formed on a face arranged to come into contact with a reaction plate or a pressure plate of a clutch, which is characterised in that the said grooves comprise a circumferential groove communicating with a plurality of radial grooves which are open at the inner periphery of the friction crown.

In accordance with further aspects taken separately or in all their technically possible combinations:

- at least one radial groove has a cross section which becomes wider in the radial direction towards the outside of the crown;
- the said circumferential groove is isolated from the outer periphery of the friction crown;

the said circumferential groove is in communication with the outer periphery of the friction crown through at least one groove having a cross section which becomes wider in the radial direction towards the outside of the crown;

the said circumferential groove is in communication with the outer periphery of the friction crown through an element which creates a loss of energy;

the said element for creating a loss of energy comprises at least one groove of smaller cross section than the said circumferential and/or radial grooves;

the said element for creating a loss of energy comprises at least one groove having a constriction;

a single circumferential groove is formed in the friction crown;

the said circumferential groove is situated in a zone lying between the halfway point on the radius of the friction crown and the outer periphery of the latter;

the said circumferential groove is on a radius situated between about two-thirds of the radius of the friction crown and its outer periphery;

the said circumferential groove has a trapezoidal cross section;

the said radial grooves have a trapezoidal cross section.

It has been possible to establish that, thanks to the invention, during the declutching operation there is set up a mattress of air under pressure of the same value between each crown of the friction disc and the associated plate of the clutch (i.e. the reaction plate or pressure plate), the effect of which is to cause effective and symmetrical disengagement of the friction crowns to take place, and in consequence a complete and total disengagement of the clutch.

BRIEF DESCRIPTION OF THE DRAWING

Further features and advantages of the invention will appear in the description, given below, of one example of an embodiment of the invention, with reference to the single FIGURE which represents a partial front view of a friction crown in accordance with the invention.

DETAILED DESCRIPTION OF THE DRAWING

Figure 1:
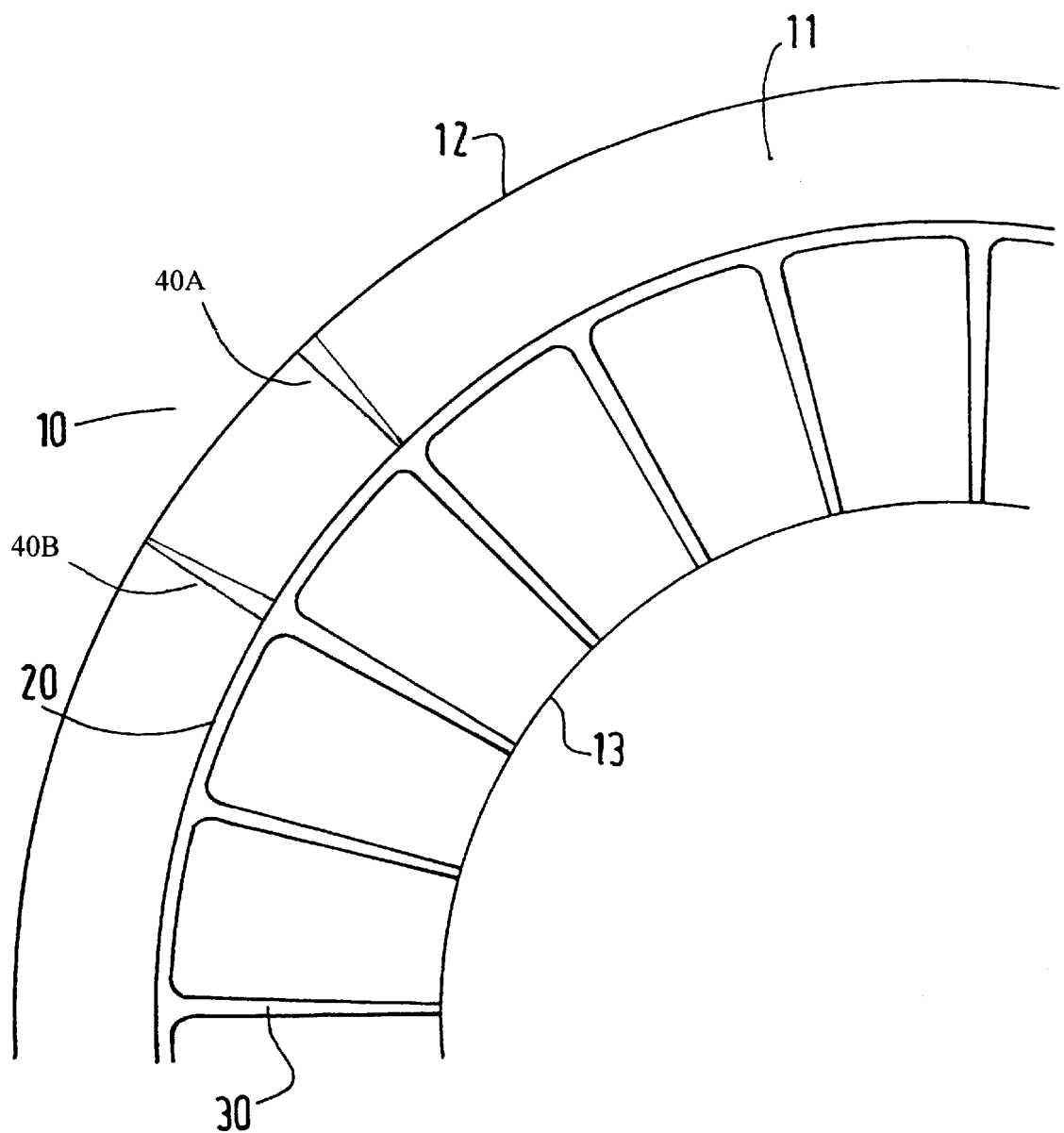

A friction disc for a dry friction clutch includes in the usual way two friction crowns, each of which is directly or indirectly fixed to a metallic support which may be common to the two crowns and which preferably forms, or is associated with, a progressive engagement device.

A torsion damper is preferably disposed between the support or supports of the friction crowns and a splined hub, which is adapted to be mounted on the input shaft of a gearbox.

Each friction crown 10 (see the single FIGURE) comprises means 20, 30 for generating an air pressure force under the effect of the rotation of the friction disc.

The said means for generating an air pressure force comprise grooves 20, 30 which are formed on the face 11 of each of the friction crowns 10 which are arranged to come into contact with, respectively, a reaction plate and a pressure plate of a clutch which, as between one crown and the other, are disposed symmetrically with respect to a median plane of the friction disc, in such a way as to set up, on either side of the friction disc when the latter is rotating, air pressure forces which are substantially equal and opposite.

It has been proposed in the past to provide friction crowns with grooves, but these latter, arranged to collect and evacuate the dust that results from wear in the friction material constituting the crowns, has no effect on the disengagement of the crowns, and can even have a detrimental effect.

As can be seen in the drawing, the said grooves comprise a circumferential groove 20 which is isolated from the outer periphery 12 of the crown 10, together with a plurality of radial grooves 30 which are open into the circumferential groove 20 and at the inner periphery 13 of the crown.

In another version, not shown, the circumferential groove is in communication with the outer periphery 12 of the crown through an element which sets up a loss of energy, such as at least one groove which, over at least part of its extent, has a general cross section which is narrower than that of the circumferential groove 20 and or radial grooves 30.

The circumferential groove 20 is situated in a zone which lies between the halfway point on the radius of the friction crown and the outer periphery 12 of the latter, and, as shown, the circumferential groove 20 is situated on a radius lying between about two-thirds of the radius of the friction crown 10 and its outer periphery 12.

The circumferential groove 10 and/or the radial grooves 30, and preferably all of them, have a trapezoidal cross section.

The Applicant has discovered in this connection that, thanks to such a form of cross section which displaces towards the outside the centre of gravity of the mattress of air trapped by the grooves, the repulsion force tending to disengage each crown 20 from the associated plate of the clutch is greatly increased, which contributes to the achievement of clean and total clutch disengagement.

Experiments have shown that the circumferential groove 20 traps a mattress of air under pressure when the clutch is in rotation, and that the radial grooves 30 feed the circumferential groove 20 with air by centrifugal effect.

In other versions, not shown:

all or part of the radial grooves have a cross section which widens in the radial direction towards the outside of the crown;

the circumferential groove is in communication with the outer periphery of the friction crown through at least one radial groove having a cross section which becomes wider in the radial direction towards the outside of the friction crown;

the radial grooves 30 are replaced by oblique grooves, but in such a way that, as between one crown and the other, in the position where they are mounted on the friction disc, the grooves have a symmetry with respect to a median plane of the friction disc;

several circumferential grooves are provided, more particularly when the friction disc has a large diameter, and they are in communication with each other through radial grooves.

What is claimed is:

1. A clutch friction disc for a dry friction clutch having two friction crowns wherein the friction crowns include means for generating an air pressure force under an effect of the rotation of the friction disc, in that the means for generating an air pressure force comprise grooves formed on a face of each of the friction crowns adapted to come into contact with a reaction plate and a pressure plate, respectively, of a clutch, and in that the grooves comprise a circumferential groove in communication with a plurality of radial grooves which are open at an inner periphery of the friction crown.

2. A friction disc according to claim 1, wherein the means for generating an air pressure force comprise grooves formed on the face of each of the friction crowns adapted to come into contact with a reaction plate and a pressure plate, respectively, of a clutch, which are disposed symmetrically, as between one friction crown and the other, with respect to a median plane of the friction disc, in such a way as to set up air pressure forces on either side of the rotating friction disc which are substantially equal and opposite.

3. A friction disc according to claim 1, wherein at least one radial groove has a cross section which becomes wider in the radial direction towards the outside of the crown.

4. A friction disc according to claim 1, wherein the circumferential groove is isolated from an outer periphery of the friction crown.

5. A friction disc according to claim 1, wherein the circumferential groove is in communication with an outer periphery of the friction crown through at least one radial groove having a cross section which becomes wider in the radial direction towards the outside of the friction crown.

6. A friction disc according to claim 1, wherein the circumferential groove is in communication with the outer periphery of the friction crown through an element which creates a loss of energy.

7. A friction disc according to claim 6, wherein the element for creating a loss of energy comprises at least one groove of smaller cross section than the circumferential and/or radial grooves.

8. A friction disc according to claim 6, wherein the element for creating a loss of energy comprises at least one groove having a constriction.

9. A friction disc according to claim 1, wherein a single circumferential groove is formed in the friction crown.

10. A friction disc according to claim 9, wherein the circumferential groove is situated in a zone lying between the halfway point on the radius of the friction crown and an outer periphery of the later.

11. A friction disc according to claim 10, wherein the circumferential groove is on a radius situated between about two-thirds of the radius of the friction crown and its outer periphery.

12. A friction disc according to claim 1, wherein the circumferential groove has a trapezoidal cross section.

13. A friction disc according to claim 1, wherein the radial grooves have a trapezoidal cross section.

14. A friction crown for a friction disc for a dry friction clutch, having airflow grooves formed on a face arranged to come into contact with a reaction plate or a pressure plate of a clutch, wherein the grooves comprise a circumferential groove communicating with a plurality of radial grooves which are open at an inner periphery of the friction crown.

15. A friction crown according to claim 14, wherein at least one radial groove has a cross section which becomes wider in the radial direction towards the outside of the crown.

16. A friction crown according to claim 14, wherein the circumferential groove is isolated from an outer periphery of the friction crown.

17. A friction crown according to claim 14, wherein the circumferential groove is in communication with the outer periphery of the friction crown through at leaat one radial groove having a cross section which becomes wider in the radial direction towards the outside of the friction crown.

18. A friction crown according to claim 14, wherein the circumferential groove is in communication with the outer periphery of the friction crown through an element which creates a loss of energy.

19. A friction crown according to claim 18, wherein the element for creating a loss of energy comprises at least one groove of smaller cross section than the circumferential and/or radial grooves.

20. A friction crown according to claim 18, wherein the element for creating a loss of energy comprises at least one groove having a constriction.

21. A friction crown according to claim 14, wherein a single circumferential groove is formed in the friction crown.

22. A friction crown according to claim 21, wherein the circumferential groove is situated in a zone lying between the halfway point on the radius of the friction crown and an outer periphery of the latter.

23. A friction crown according to claim 22, wherein the circumferential groove is on a radius situated between about two-thirds of the radius of the friction crown and its outer periphery.

24. A friction crown according to claim 14, wherein the circumferential groove has a trapezoidal cross section.

25. A friction crown according to claim 14, wherein the radial grooves have a trapezoidal cross section.

26. A clutch friction disc for a dry friction clutch, comprising:

two friction crowns having grooves formed on a face of each of the friction crowns adapted to come into contact with a reaction plate and a pressure plate, respectively, of a clutch, the grooves including a circumferential groove in communication with a plurality of radial grooves which are open at an inner periphery of the friction crown.

* * * * *